US008688274B2

(12) United States Patent
Shieh et al.

(10) Patent No.: US 8,688,274 B2
(45) Date of Patent: Apr. 1, 2014

(54) ROBOT POSITIONING METHOD AND CALIBRATION METHOD

(75) Inventors: Po-Huang Shieh, Miaoli County (TW); Shang-Chieh Lu, Tainan (TW); Bor-Tung Jiang, Hsinchu (TW); Kuo-Tang Huang, Taoyuan County (TW); Chin-Kuei Chang, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 490 days.

(21) Appl. No.: 13/013,690

(22) Filed: Jan. 25, 2011

(65) Prior Publication Data

US 2012/0143370 A1    Jun. 7, 2012

(30) Foreign Application Priority Data

Dec. 3, 2010    (TW) ................. 99142245 A (51) Int. Cl.
    *G05B 19/18*      (2006.01)
    *G05B 19/04*      (2006.01)

(52) U.S. Cl.
    USPC .......... 700/254; 700/245; 700/250; 700/253; 700/258; 700/259

(58) Field of Classification Search
    USPC ................................ 700/245–264
    See application file for complete search history.

(56) References Cited

U.S. PATENT DOCUMENTS

| | | | | |
|---|---|---|---|---|
| 4,831,549 | A | * | 5/1989 | Red et al. ............. 700/254 |
| 5,083,073 | A | * | 1/1992 | Kato .................. 318/577 |
| 5,297,238 | A | | 3/1994 | Wang et al. |
| 5,570,190 | A | | 10/1996 | Terawaki et al. |
| 6,114,824 | A | | 9/2000 | Watanabe |
| 6,236,896 | B1 | | 5/2001 | Watanabe et al. |
| 6,615,112 | B1 | | 9/2003 | Roos |
| 7,161,321 | B2 | | 1/2007 | Ban et al. |
| 2005/0102060 | A1 | | 5/2005 | Watanabe et al. |

FOREIGN PATENT DOCUMENTS

| | | |
|---|---|---|
| CN | 1033590 A | 7/1989 |
| CN | 1727839 A | 2/2006 |
| CN | 101524842 A | 9/2009 |
| TW | I254662 | 5/2006 |

OTHER PUBLICATIONS

State Intellectual Property Office of the People's Republic of China, "Office Action", China, Nov. 29, 2013.
Intellectual Property Office, Ministry of Economic Affairs, R.O.C., "Office Action", Feb. 21, 2013, Taiwan.

* cited by examiner

*Primary Examiner* — Bhavesh V Amin
(74) *Attorney, Agent, or Firm* — Morris Manning & Martin LLP; Tim Tingkang Xia, Esq.

(57) ABSTRACT

A robot positioning method includes the following steps. A optical sensing device is configured at a front end of a robot. Then, the optical sensing device captures a calibration plate image, and a relative position of the optical sensing device with respective to a calibration plate is calculated according to a Bundle Adjustment. A robot calibration method includes the following steps. An optical sensing device is driven to rotate around a reference axis of a calibration plate, so as to calculate a translation matrix between the calibration plate and the robot, and the optical sensing device is driven to translate along three orthogonal reference axes of the calibration plate, so as to calculate a rotation matrix between the calibration plate and the robot.

4 Claims, 12 Drawing Sheets

S101 — The control unit drives the robot to move, so that the calibration plate is located in an optical sensing range of the optical sensing device, and after that, since an image of the calibration plate is mapped to the CCD through the lens, the optical sensing device captures a calibration plate image.

S102 — According to the calibration plate image, the control unit calculates a transformation matrix between the optical sensing device coordinate system and the calibration plate coordinate system and an optical sensing device-calibration plate coordinate value.

According to the three translation direction vectors and direction vectors of base coordinate axes, the control unit calculates a rotation matrix between the calibration plate coordinate system and the base coordinate system. — S409

FIG.6

According to a relational expression, the translation matrix, and the rotation matrix between the calibration plate coordinate system and the base coordinate system, the control unit calculates a relative position between the calibration plate coordinate system and the base coordinate system. — S501

ROBOT POSITIONING METHOD AND CALIBRATION METHOD

CROSS-REFERENCE TO RELATED APPLICATIONS

This non-provisional application claims priority under 35 U.S.C. §119(a) on patent application No(s). 099142245 filed in Taiwan, R.O.C. on Dec. 3, 2010, the entire contents of which are hereby incorporated by reference.

BACKGROUND OF THE INVENTION

1. Field of Invention

The present invention relates to a robot, and more particularly to a robot positioning method and calibration method.

2. Related Art

In the recent decade, robots are generally used in the industry to achieve automatic production. However, most of the applications of the robots are still limited to dealing with repeated processes, and in this case, an experienced operator needs to manipulate a robot in advance to teach the robot to move along a fixed track. In the miniature, diversified, and small-quantity production mode of the electronic industry, the method of teaching the robot by the operator in the automatic production may waste a lot of time, and the manufacturing cost is also increased. Therefore, the prior art provides a method of guiding a robot with a camera device to replace the conventional method of teaching the robot by the operator. However, the method of guiding the robot with the camera device needs to be used together with a stereo vision module, so as to reduce the calibration time of the robot.

In a vision guided robot (VGR) system, the calibration of the camera device and the Hand-Eye calibration are quite important. Thus, it is a critical issue to be solved on how to establish a robot positioning method and calibration method to obtain a transformation matrix of the robot and the object and a distortion error value of the camera device.

Taking U.S. Pat. No. 7,161,321 (referred to as Patent '321 for short hereinafter) as an example, during the calibration of a robot, an acicular object is arranged at a front end of the robot. The robot further has a driving unit, which is used together with a monitoring device disposed on the external side of the robot to perform the calibration of the robot. The monitoring device includes a camera device, a display device, and a control unit, in which the camera device is disposed at a fixed position. The calibration method disclosed in Patent '321 is that, the acicular object on the robot is guided to move to a frame of the camera device, and the camera device captures a frame of a tip of the acicular object. After that, the frame of the tip is transmitted back to the display device, the control unit calculates a transformation matrix between the robot and the display device, and the control unit drives the robot to move to the position of the display device.

However, the monitoring device in Patent '321 is an apparatus configured at the external side of the robot, and the monitoring device needs to be additionally purchased when buying the robot. Thereby, the technology disclosed in Patent '321 has a high apparatus cost. Further, in Patent '321, every time before the calibration of the robot, the monitoring device configured at the external side of the robot needs to be electrically connected to the robot, so that an additional time is required before the calibration to electrically connect the monitoring device to the robot, which increases the calibration procedure of the robot, and reduces the calibration efficiency of the robot. In addition, during the calibration of the robot, the camera device captures the frame of the tip of the acicular object, and transmits the frame back to the monitoring device configured at the external side of the robot; then, the monitoring device calculates a transformation matrix between the robot and the object, and guides the robot to move to the position of the display device according to the transformation matrix, such that it is impossible to transmit the transformation matrix back to the robot in time, and thus the calibration method in Patent '321 takes an excessively long calibration time. Therefore, in Patent '321, too much time is wasted before calibration, the apparatus cost is high, and the calibration time is too long.

SUMMARY OF THE INVENTION

Accordingly, the present invention is a robot positioning method and calibration method, in which an optical sensing device is configured at a front end of a robot, and a spatial relation between a calibration plate and the robot is figured out according to a spatial relation between the optical sensing device and the calibration plate, so as to solve the problems of high apparatus cost and excessively long calibration time in the prior art.

In an embodiment, the present invention provides a robot positioning method, which comprises the following steps. Firstly, a robot and a calibration plate are provided. The robot has a control unit, and an optical sensing device is disposed on a front end of the robot. The optical sensing device has an optical sensing device coordinate system fixed thereon. Multiple positioning marks are disposed on a surface of the calibration plate, and the calibration plate has a calibration plate coordinate system fixed thereon. Next, a positioning step is performed, in which the optical sensing device captures a calibration plate image by using a Bundle Adjustment, and transmits the calibration plate image back to the control unit; then, the control unit calculates a transformation matrix between the optical sensing device coordinate system and the calibration plate coordinate system and an optical sensing device-calibration plate coordinate value.

In an embodiment of the robot positioning method according to the present invention, the optical sensing device has a lens and a charge coupled device (CCD), in which the lens has multiple lens distortion values. The method of obtaining the transformation matrix between the optical sensing device coordinate system and the calibration plate coordinate system and the optical sensing device-calibration plate coordinate value comprises the following steps. The control unit captures a positioning mark-calibration plate coordinate value of each positioning mark in the calibration plate coordinate system. The control unit captures a positioning mark-optical sensing surface coordinate value of each positioning mark in the calibration plate image in the optical sensing surface coordinate system. By using one of the positioning mark-optical sensing surface coordinate values as a reference point, the control unit calculates a distance value between each of the rest positioning mark-optical sensing surface coordinate values and the reference point.

Afterward, the control unit substitutes the positioning mark-calibration plate coordinate values, the positioning mark-optical sensing surface coordinate values, the distance values, and a focal length value of the lens into a Bundle Adjustment formula, to calculate multiple matrix elements of the transformation matrix and the optical sensing device-calibration plate coordinate value.

In an embodiment, the present invention further provides a robot calibration method, which comprises the following steps. Firstly, a robot is provided. The robot has a control unit and a base. The base has a base coordinate system fixed thereon. An optical sensing device is disposed on a front end of the robot, and the optical sensing device has an optical sensing device coordinate system fixed thereon. A calibration plate is also provided, in which multiple positioning marks are disposed on a surface of the calibration plate, and the calibration plate has a calibration plate coordinate system fixed thereon.

Then, the control unit drives the robot to rotate around one point on a coordinate axis of the calibration plate coordinate system as a center point, and records multiple rotation positions of the optical sensing device. According to the rotation positions, the positioning step in the above robot positioning method is performed, in which the control unit calculates multiple rotation coordinate values of the rotation positions in the calibration plate coordinate system, and transmits the rotation coordinate values back to the control unit; and the control unit calculates a center point-calibration plate coordinate value of the center point in the calibration plate coordinate system. Further, the control unit calculates a center point-base coordinate value of the center point in the base coordinate system. Afterward, the control unit calculates a translation matrix between the calibration plate coordinate system and the base coordinate system.

Next, the rotation matrix between the calibration plate coordinate system and the base coordinate system is calculated, which comprises the following steps. The control unit drives the robot to translate once sequentially along three orthogonal axes of the calibration plate coordinate system, and records multiple translation positions of the optical sensing device in the calibration plate coordinate system. According to the translation positions, the positioning step in the above robot positioning method is performed, in which the control unit calculates a translation coordinate value of each translation position in the calibration plate coordinate system. According to the translation coordinate values, the control unit calculates three translation direction vectors in parallel with the three orthogonal axes of the calibration plate coordinate system. Afterward, according to the three translation direction vectors and direction vectors of base coordinate axes, the control unit calculates a rotation matrix between the calibration plate coordinate system and the base coordinate system.

In the embodiments of the robot positioning method and calibration method according to the present invention, the optical sensing device is directly configured on the front end of the robot, and the calibration plate is used to obtain the position of the optical sensing device in the calibration plate coordinate system. That is, in the present invention, the optical sensing device on the robot is used together with the calibration plate, to replace the calibration method in the prior art of electrically connecting the optical sensing device, the control unit, and the display device to the robot, and disposing an acicular object at the front end of the robot.

During the calibration process, since the optical sensing device is directly configured on the robot, the optical sensing device captures the image and directly transmits the image back to the display device of the robot, so that no additional display device needs to be configured. Thereby, as compared with the prior art, the method of configuring the optical sensing device on the robot can save the apparatus cost.

In the embodiments of the robot positioning method and calibration method according to the present invention, when the robot needs to be calibrated, the calibration plate can be randomly disposed at any fixed position, and thus the acicular object does not need to be arranged on the robot, as described in the prior art. Thereby, as compared with the prior art, the method of replacing the acicular object with the calibration plate can save the time taken before installation.

In addition, when considering mirror correction deformation error values, in the present invention, the distortion error value is also substituted into the Bundle Adjustment, so that the optical sensing device captures the image, and the control unit calculates the transformation matrix and the distortion error value at the same time. Thereby, as compared with the prior art, the mirror correction deformation error value can be considered to increase the precision of the calibration.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 8:
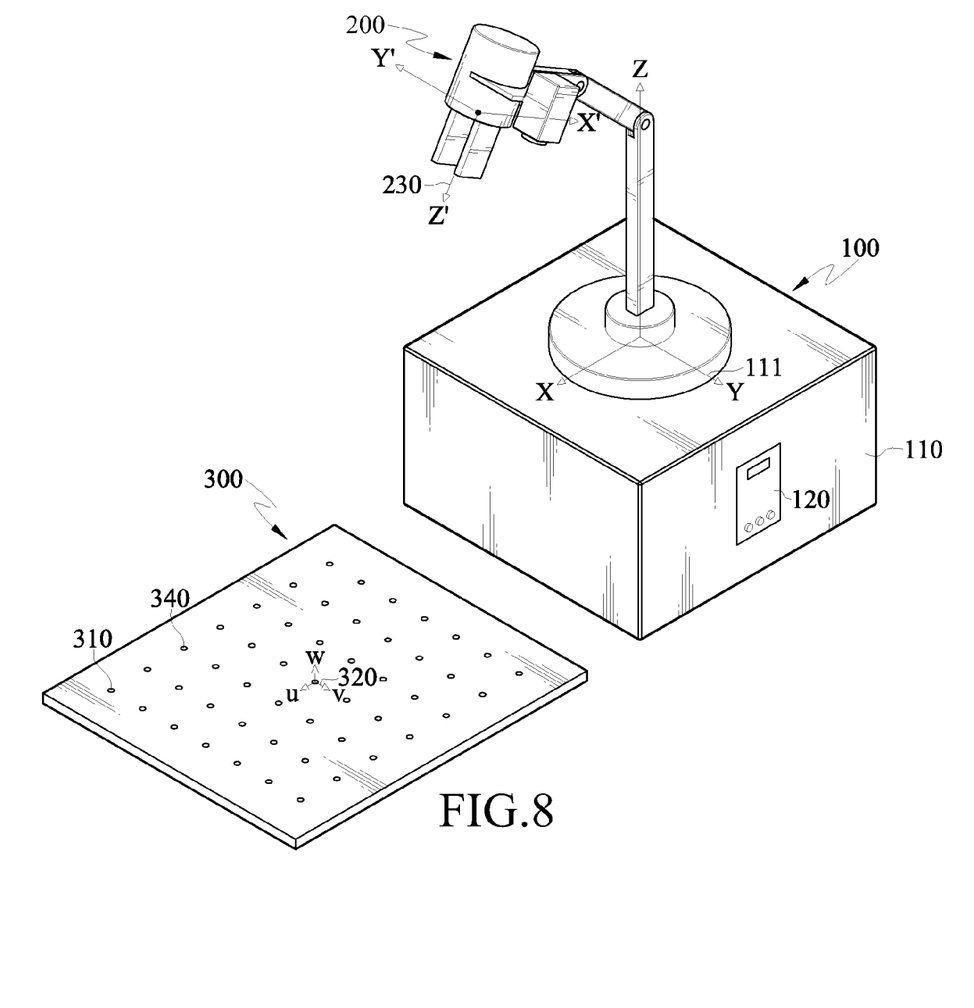
FIG. 8 is a schematic plane view of a robot calibration device in a robot positioning method and calibration method according to an embodiment of the present invention.
Figure 9A:
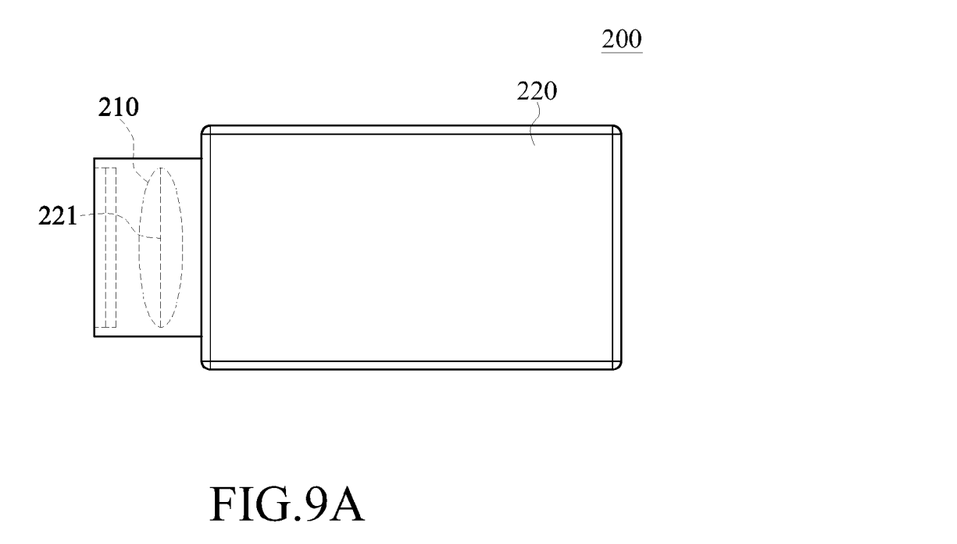
FIG. 9A is a schematic exploded view of an optical sensing device 200 in a robot positioning method and calibration method according to an embodiment of the present invention.
Figure 9B:
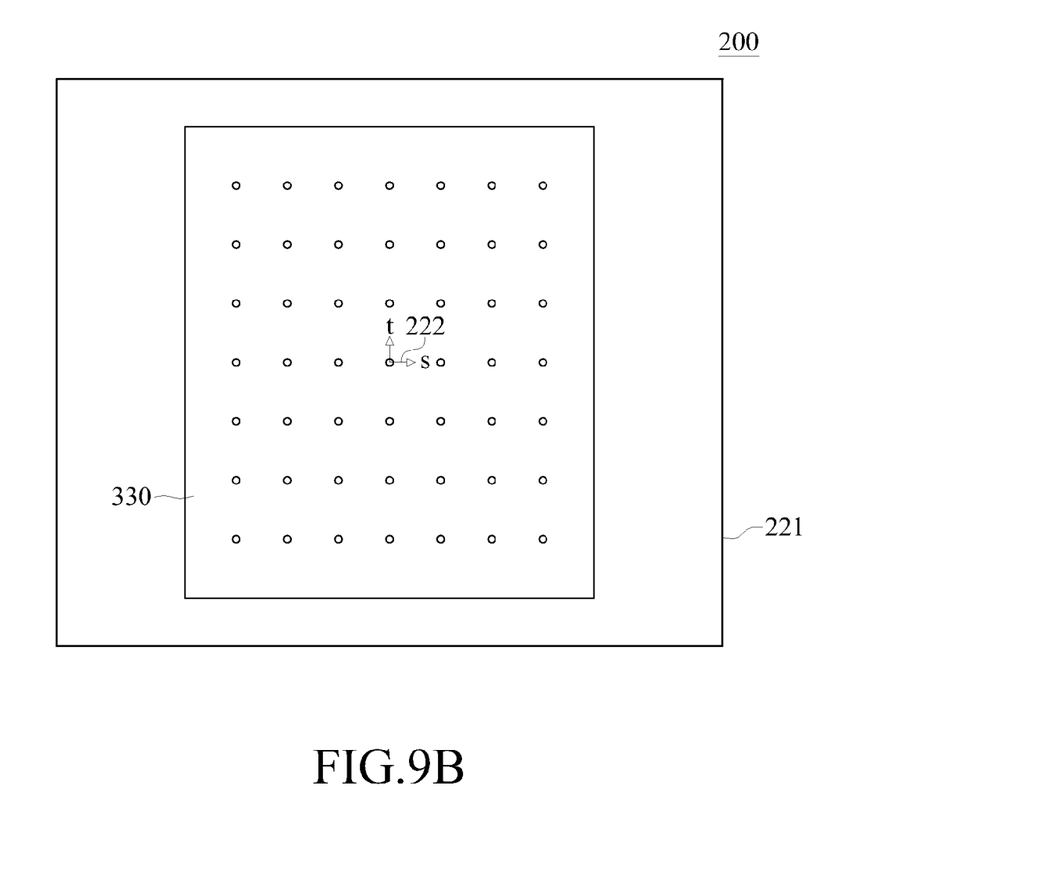
FIG. 9B is a schematic view of an optical sensing surface 221 in a robot positioning method and calibration method according to an embodiment of the present invention.
Figure 10A:
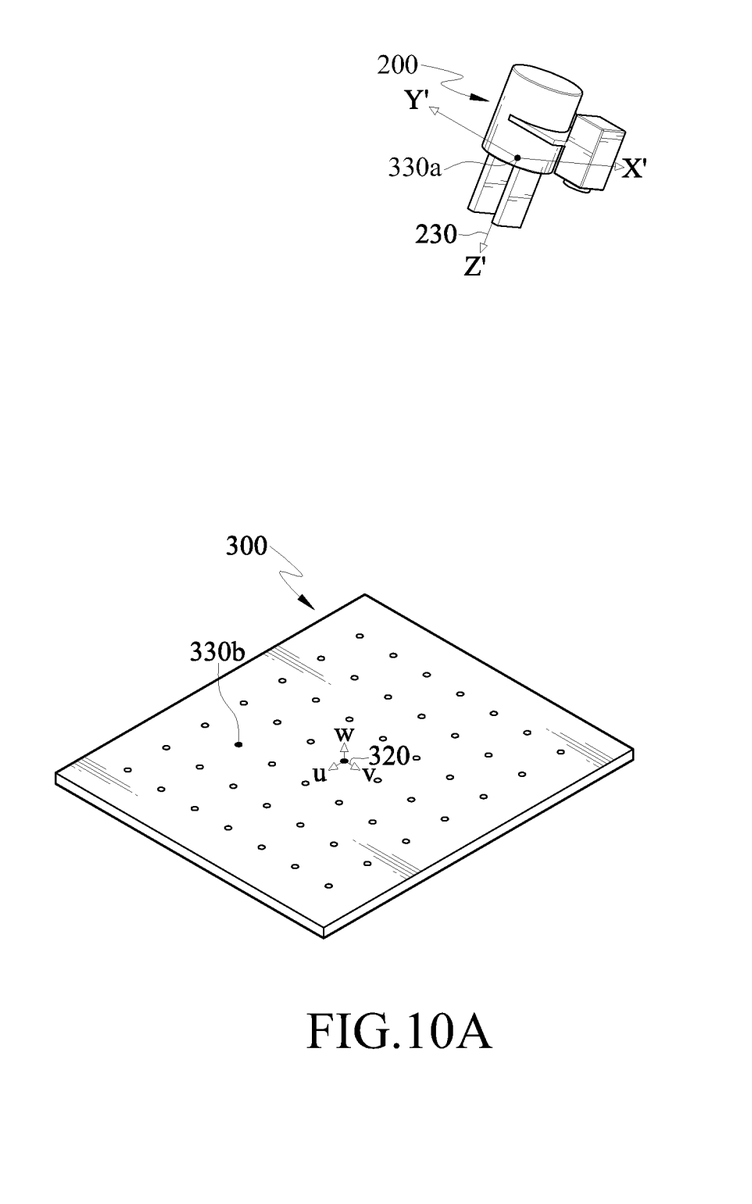
FIG. 10A is a schematic view of a calibration plate coordinate system 320 in a robot positioning method and calibration method according to an embodiment of the present invention.
Figure 10B:
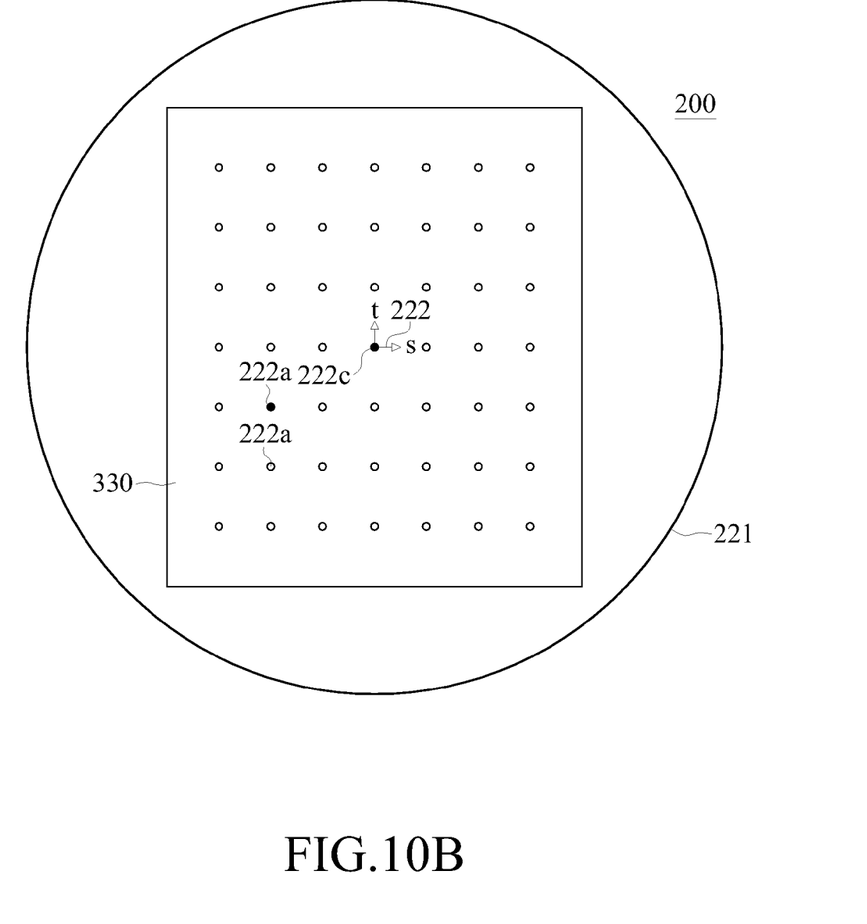
FIG. 10B is a schematic view of an optical sensing surface coordinate system 222 in a robot positioning method and calibration method according to an embodiment of the present invention.

In an embodiment of the present invention, a robot calibration system is first provided. Referring to FIG. 8 to FIG. 9B, the robot calibration system comprises a robot 100, an optical sensing device 200, and a calibration plate 300. The robot 100 has a base 110 and a control unit 120. The optical sensing device 200 has, for example, a lens 210 and a CCD 220, the CCD 220 has an optical sensing surface 221, and multiple positioning marks 310 are disposed on a surface of the calibration plate 300. The base 110 has a base coordinate system 111, the optical sensing device 200 has an optical sensing device coordinate system 230, the optical sensing surface 221 has an optical sensing surface coordinate system 222, and the calibration plate 300 has a calibration plate coordinate system 320.

Based on the above robot 100, the optical sensing device 200, and the calibration plate 300, the present invention performs a positioning step, to obtain a relative position between the optical sensing device 200 and the calibration plate 300. The positioning step is described in the following. Referring to FIG. 1 and FIG. 8 to FIG. 10A, firstly, in Step S101, the control unit 120 drives the robot 100 to move, so that the calibration plate 300 is located in an optical sensing range of the optical sensing device 200. After that, since an image of the calibration plate 300 is mapped to the CCD 220 through the lens 210, the optical sensing device 200 captures a calibration plate image 330. Then, in Step S102, according to the calibration plate image 330, the control unit 120 calculates a transformation matrix between the optical sensing device coordinate system 230 and the calibration plate coordinate system 320 and an optical sensing device-calibration plate coordinate value 330a.

The positioning step S102 is illustrated with an example below. Referring to FIG. 2 and FIG. 8 to FIG. 9B, firstly, in Step S201, the control unit 120 captures a positioning mark-calibration plate coordinate value 330b of each positioning mark 310 on the calibration plate 300 in the calibration plate coordinate system 320. Then, in Step S202, the control unit 120 captures a positioning mark-optical sensing surface coordinate value 222a of each positioning mark 310 in the calibration plate image 330 in the optical sensing surface coordinate system 222. After that, in Step S203, the control unit 120 substitutes the positioning mark-calibration plate coordinate values 330b, the positioning mark-optical sensing surface coordinate values 222a, and a focal length value of the lens 210 into a Bundle Adjustment formula, to calculate multiple matrix elements in the transformation matrix between the optical sensing device coordinate system 230 and the calibration plate coordinate system 320 and the optical sensing device-calibration plate coordinate value 330a.

Figure 1:
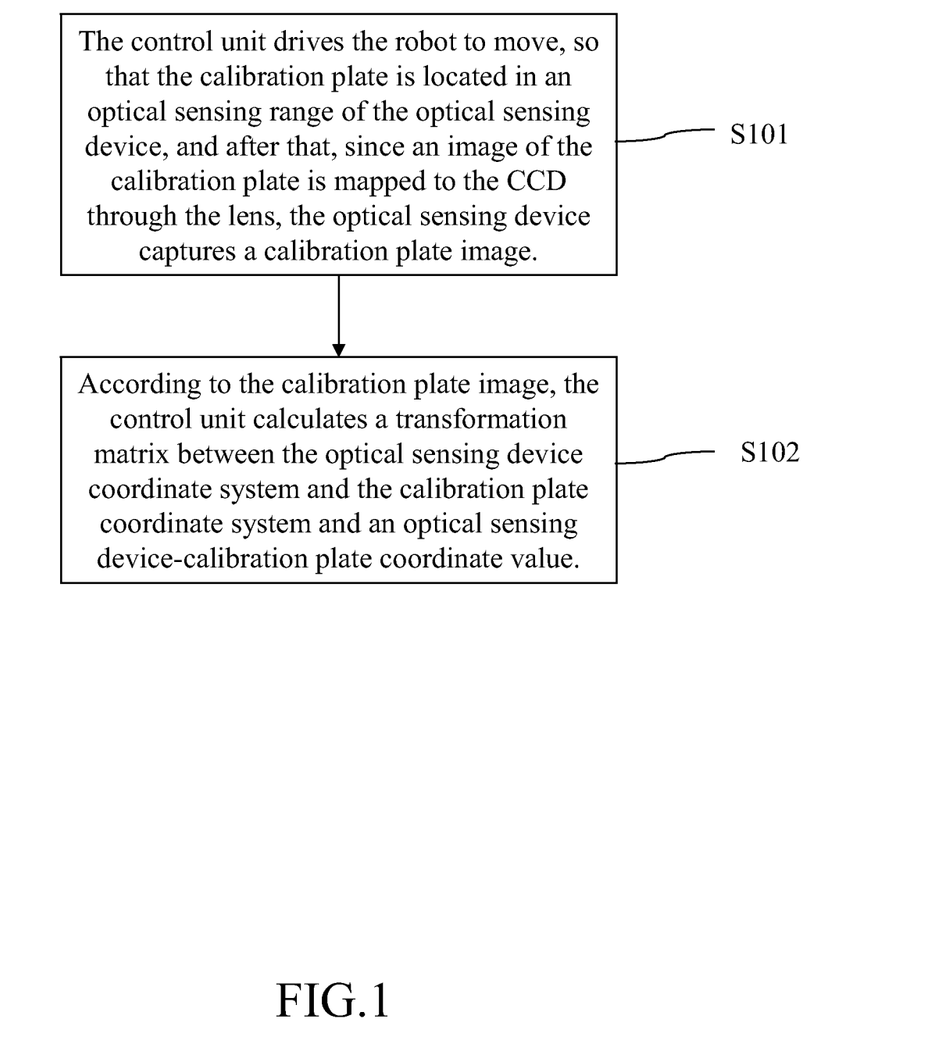
FIG. 1 is a flow chart of a positioning step in a robot positioning method and calibration method according to an embodiment of the present invention.
Figure 2:
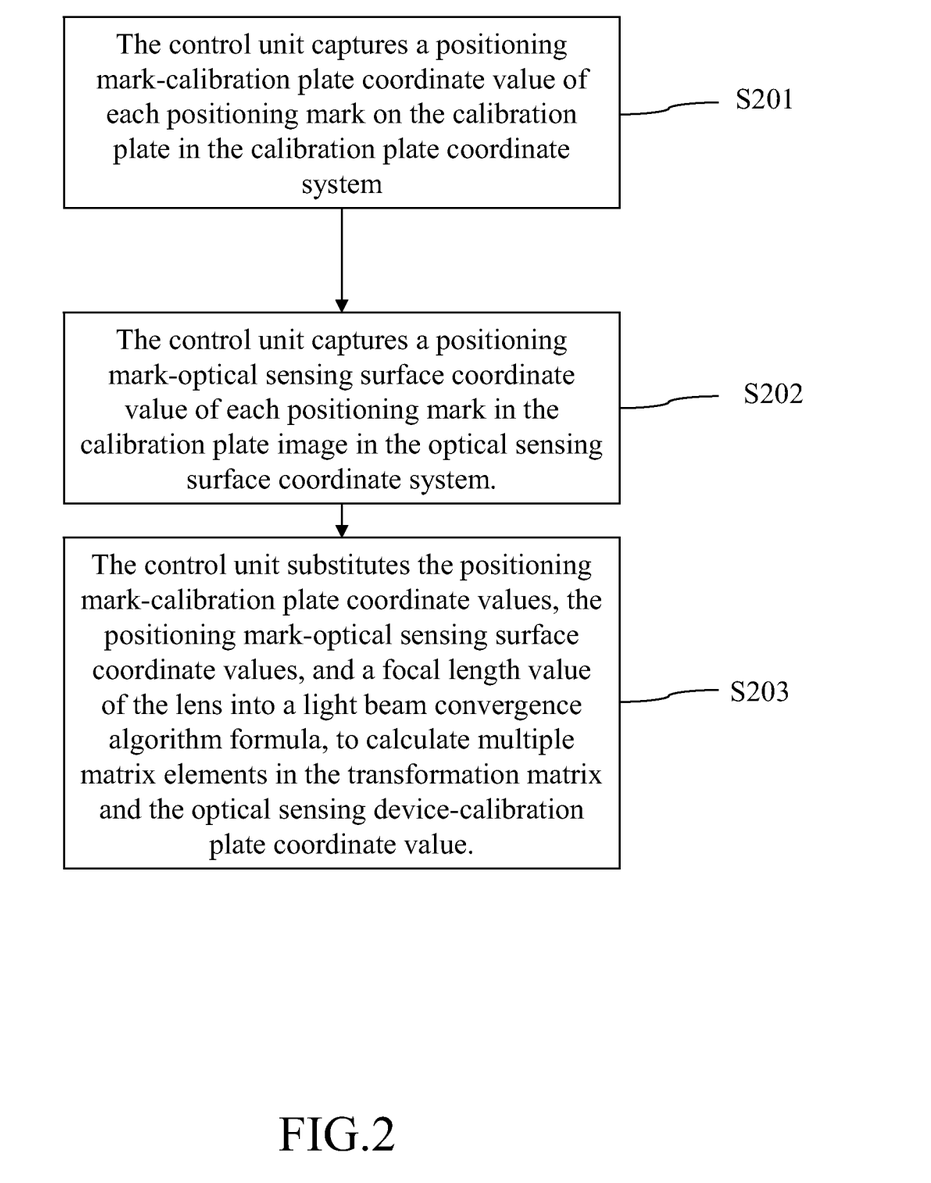
FIG. 2 is a flow chart of a positioning method in a robot positioning method and calibration method according to an embodiment of the present invention.

The Bundle Adjustment formula mentioned in Step S203 is as follows:

$$x_a - x_0 = -f\left[\frac{m_{11}(X_A - X_L) + m_{12}(Y_A - Y_L) + m_{13}(Z_A - Z_L)}{m_{31}(X_A - X_L) + m_{32}(Y_A - Y_L) + m_{33}(Z_A - Z_L)}\right]$$

$$y_a - y_0 = -f\left[\frac{m_{21}(X_A - X_L) + m_{22}(Y_A - Y_L) + m_{23}(Z_A - Z_L)}{m_{31}(X_A - X_L) + m_{32}(Y_A - Y_L) + m_{33}(Z_A - Z_L)}\right].$$

Specifically, if any of the positioning marks 310 on the calibration plate 300 is selected as a positioning mark A, in the above algorithm formula, $x_a$ and $y_a$ are a positioning mark-optical sensing surface coordinate value 222a of the positioning mark A in the optical sensing surface coordinate system 222, $x_0$ and $y_0$ are a projection center 222c of the optical sensing surface coordinate system 222, $m_{ij}$ is a matrix element in the transformation matrix between the optical sensing device coordinate system 230 and the calibration plate coordinate system 320, where i: 1 to 3 and j: 1 to 3, $X_A$, $Y_A$, and $Z_A$ are a positioning mark-calibration plate coordinate value 330b of the positioning mark A on three orthogonal coordinate axes of the calibration plate coordinate system 320, and $X_L$, $Y_L$, and $Z_L$ are an optical sensing device-calibration plate coordinate value 330a of a coordinate center on the orthogonal coordinate axes of the calibration plate coordinate system 320.

The step of obtaining the transformation matrix and the optical sensing device-calibration plate coordinate value 330a is illustrated with an example in detail below. Firstly, the optical sensing device 200 captures a calibration plate image 330, the calibration plate image 330 captured by the optical sensing device 200 is transmitted back to the control unit 120, and the optical sensing surface coordinate system 222 is used to describe the position of each positioning mark 310 in the calibration plate image 330. Afterward, a positioning mark 340 is selected on the calibration plate 300, and the control unit 120 captures a positioning mark-calibration plate coordinate value of the positioning mark 340 in the calibration plate coordinate system 320, that is, $(X_A, Y_A, Z_A)$. Then, an optical sensing surface coordinate value of the image of the positioning mark 340 in the optical sensing surface coordinate system 222 is selected from the calibration plate image 330, that is, $(x_a, y_a)$.

Next, the control unit 120 substitutes $(X_A, Y_A, Z_A)$, $(x_a, y_a)$, and a focal length value f of the lens 210 into the Bundle Adjustment formula, to obtain an equation.

After that, the rest positioning marks 310 are selected one by one, and the rest positioning mark-calibration plate coordinate values 330b, the rest positioning mark-optical sensing surface coordinate values 222a, and the focal length value of the lens 210 are substituted into the Bundle Adjustment formula, to obtain multiple equations. Then, the control unit 120 iterates all the matrix elements in the transformation matrix between the optical sensing device coordinate system 230 and the calibration plate coordinate system 320 and the optical sensing device-calibration plate coordinate value of the optical sensing device 200 by using a least square method (LSM).

In this embodiment, the number of the positioning marks 310 on the calibration plate 300 is 49, and thus 98 equations are generated by using the positioning marks 310. Therefore, in this embodiment, through the 98 equations, the control unit 120 iterates multiple matrix elements in the transformation matrix between the optical sensing device coordinate system 230 and the calibration plate coordinate system 320 and the optical sensing device-calibration plate coordinate value 330a of the optical sensing device 200 by using the LSM.

In other embodiments of the present invention, the above Bundle Adjustment formula may be modified according to multiple lens distortion values of the lens 210, so as to correctly obtain a relative position between the optical sensing device 200 and the calibration plate 300.

The lens distortion value correction step is illustrated below. Referring to FIG. 3 and FIG. 8 to FIG. 9B, firstly, in Step S301, the control unit 120 captures a positioning mark-calibration plate coordinate value 330b of each positioning mark 310 in the calibration plate coordinate system 320. Then, in Step S302, the control unit 120 captures a positioning mark-optical sensing surface coordinate value 222a of each positioning mark 310 in the calibration plate image 330 in the optical sensing surface coordinate system 222. In Step S303, by using one of the positioning mark-optical sensing surface coordinate values 222a as a reference point, the control unit 120 calculates a distance value between each of the rest positioning mark-optical sensing surface coordinate values 222a and the reference point. Afterward, in Step S304, the control unit 120 substitutes the positioning mark-calibration plate coordinate values 330b, the positioning mark-optical sensing surface coordinate values 222a, the distance values, and a focal length value of the lens 210 into a Bundle Adjustment formula, to calculate multiple matrix elements in the transformation matrix and the optical sensing device-calibration plate coordinate value 330a.

Figure 3:
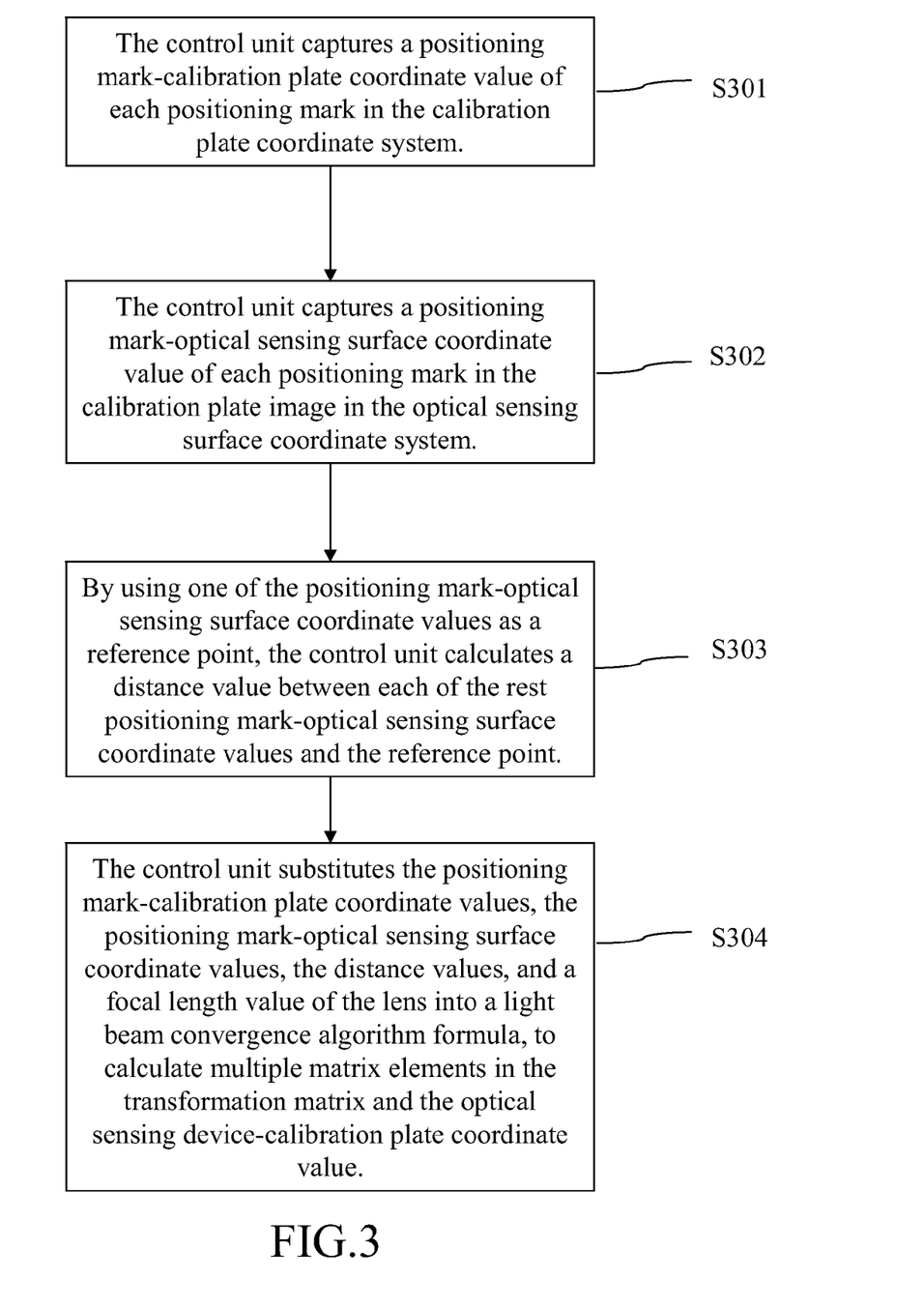
FIG. 3 is a flow chart of a positioning method with a lens distortion correction effect in a robot positioning method and calibration method according to an embodiment of the present invention.

The lens distortion value correction step is illustrated with an example in detail below. Firstly, the optical sensing device 200 captures a calibration plate image 330, the calibration plate image 330 captured by the optical sensing device 200 is transmitted back to the control unit 120, and the optical sensing surface coordinate system 222 is used to describe the position of each positioning mark 310 in the calibration plate image 330. Afterward, a positioning mark 340 is selected on the calibration plate 300, and the control unit 120 captures a positioning mark-calibration plate coordinate value of the positioning mark 340 in the calibration plate coordinate system 320, that is, $(X_A, Y_A, Z_A)$. Then, an optical sensing surface coordinate value of the image of the positioning mark 340 in the optical sensing surface coordinate system 222 is selected from the calibration plate image 330, that is, $(x_a, y_a)$.

Subsequently, a lens distortion value correction method is adopted to add a barrel distortion error correction value and a tangential distortion error correction value to the original positioning mark-optical sensing surface coordinate value 222a, so as to obtain a lens distortion value correction formula. The lens distortion value correction formula is as follows:

$$\begin{cases} x_a \to x'_a + \delta x + \Delta x \\ y_a \to y'_a + \delta y + \Delta y \end{cases}$$

where $\delta x$ and $\delta y$ are the barrel distortion error correction value of the optical sensing device 200, and x and y are the tangential distortion error correction value of the optical sensing device 200.

After the lens distortion value correction method is performed, the positioning mark-optical sensing surface coordinate value 222a is substituted into the Bundle Adjustment formula, to generate a Bundle Adjustment formula with a lens distortion value correction effect. The Bundle Adjustment formula with the lens distortion value correction effect is as follows:

$$(x_a + \delta x + \Delta x) - x_0 = -f \left[ \frac{m_{11}(X_A - X_L) + m_{12}(Y_A - Y_L) + m_{13}(Z_A - Z_L)}{m_{31}(X_A - X_L) + m_{32}(Y_A - Y_L) + m_{33}(Z_A - Z_L)} \right]$$

$$(y_a + \delta y + \Delta y) - y_0 = -f \left[ \frac{m_{21}(X_A - X_L) + m_{22}(Y_A - Y_L) + m_{23}(Z_A - Z_L)}{m_{31}(X_A - X_L) + m_{32}(Y_A - Y_L) + m_{33}(Z_A - Z_L)} \right]$$

where $$\begin{cases} \delta x = \overline{x}(k_1 r^2 + k_2 r^4) \\ \delta y = \overline{y}(k_1 r^2 + k_2 r^4) \\ \Delta x = (1 + p_3 r^2)[p_1(r^2 + 2\overline{x}^2) + 2p_2 \overline{xy}] \\ \Delta y = (1 + p_3 r^2)[2p_1 \overline{xy} + p_2(r^2 + 2\overline{y}^2)] \end{cases}$$

Specifically, if any of the positioning marks 310 on the calibration plate 300 is selected as a positioning mark A, in the above algorithm formula, $x_a$ and $y_a$ are a positioning mark-optical sensing surface coordinate value 222a of the positioning mark A in the optical sensing surface coordinate system 222, $x_0$ and $y_0$ are a projection center 222c of the optical sensing surface coordinate system 222, r is a distance value between the optical sensing surface coordinate value of the positioning mark A and the reference point, $m_{ij}$ is a matrix element in the transformation matrix between the optical sensing device coordinate system 230 and the calibration plate coordinate system 320, where i: 1 to 3 and j: 1 to 3, $X_A$, $Y_A$, and $Z_A$ are a positioning mark-calibration plate coordinate value 330b of the positioning mark A on three orthogonal coordinate axes of the calibration plate coordinate system 320, $X_L$, $Y_L$, and $Z_L$ are an optical sensing device-calibration plate coordinate value 330a of the coordinate center on the orthogonal coordinate axes of the calibration plate coordinate system 320, $K_1$, $K_2$, $K_3$, $P_1$, $P_2$, and $P_3$ are lens distortion parameter values, $\delta x$ and $\delta y$ are a barrel distortion error correction value of the optical sensing device 200, and x and y are a tangential distortion error correction value of the optical sensing device 200.

Figure 4:
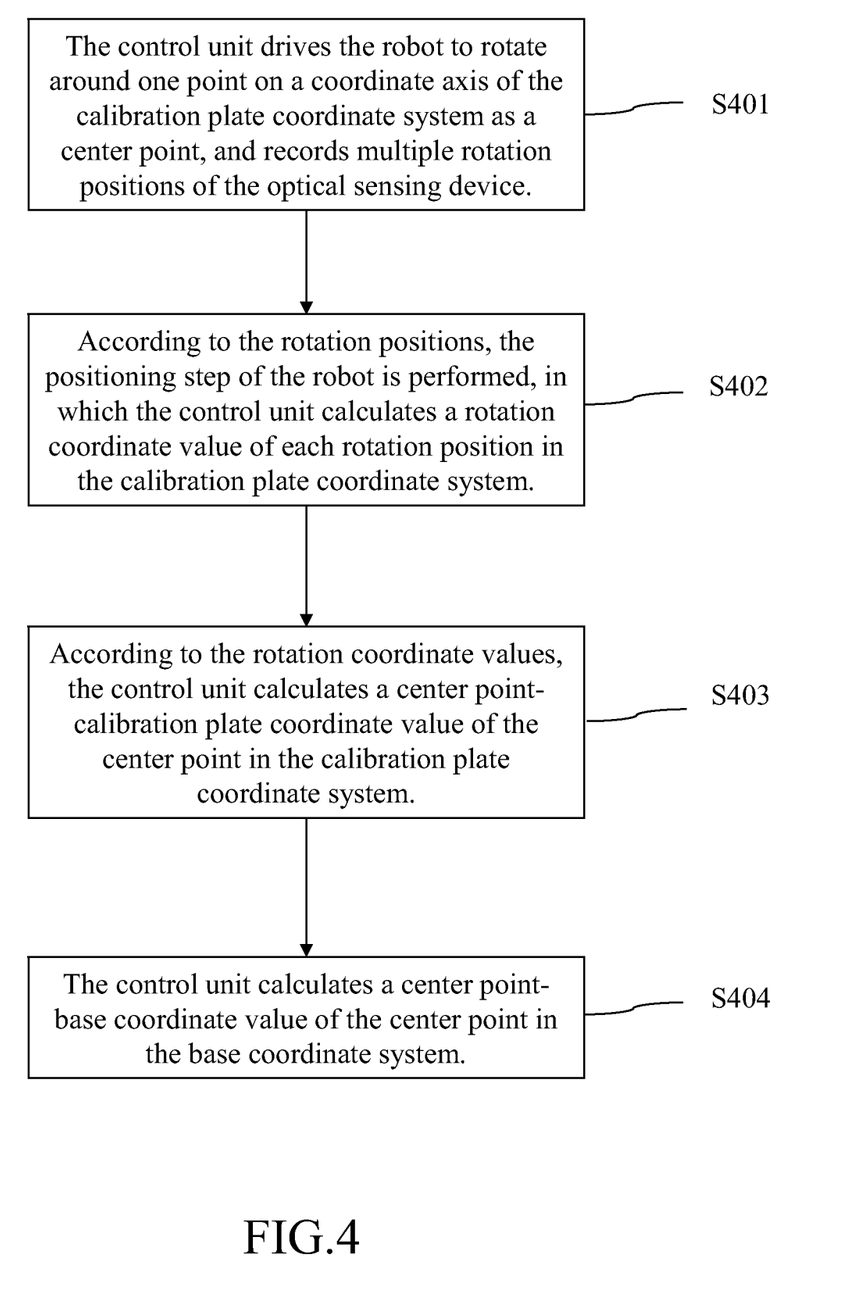
FIG. 4, FIG. 5, and FIG. 6 are flow charts of rotation and translation operations of an optical sensing device in a robot positioning method and calibration method according to an embodiment of the present invention.
Figure 5:
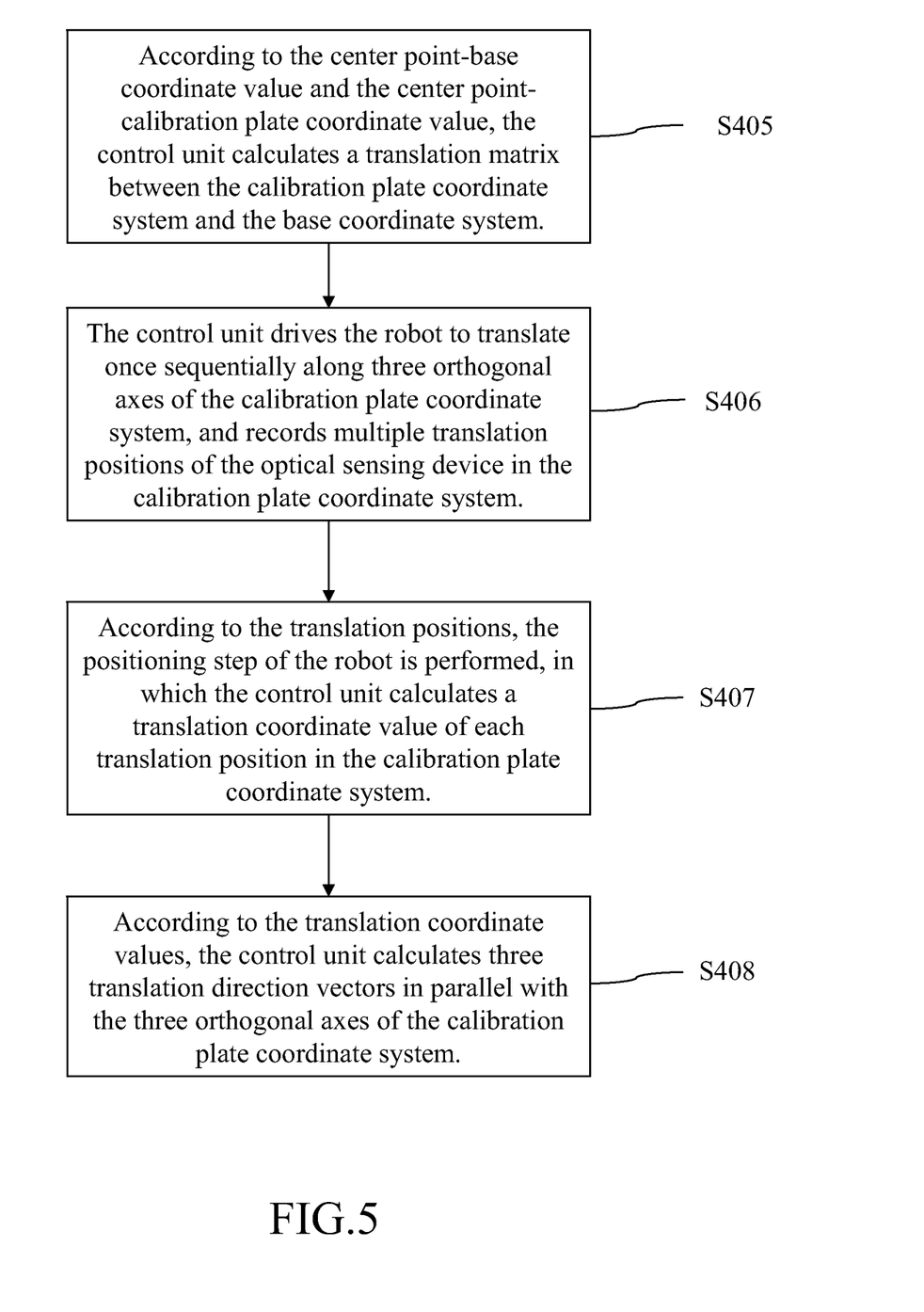
Figure 6:
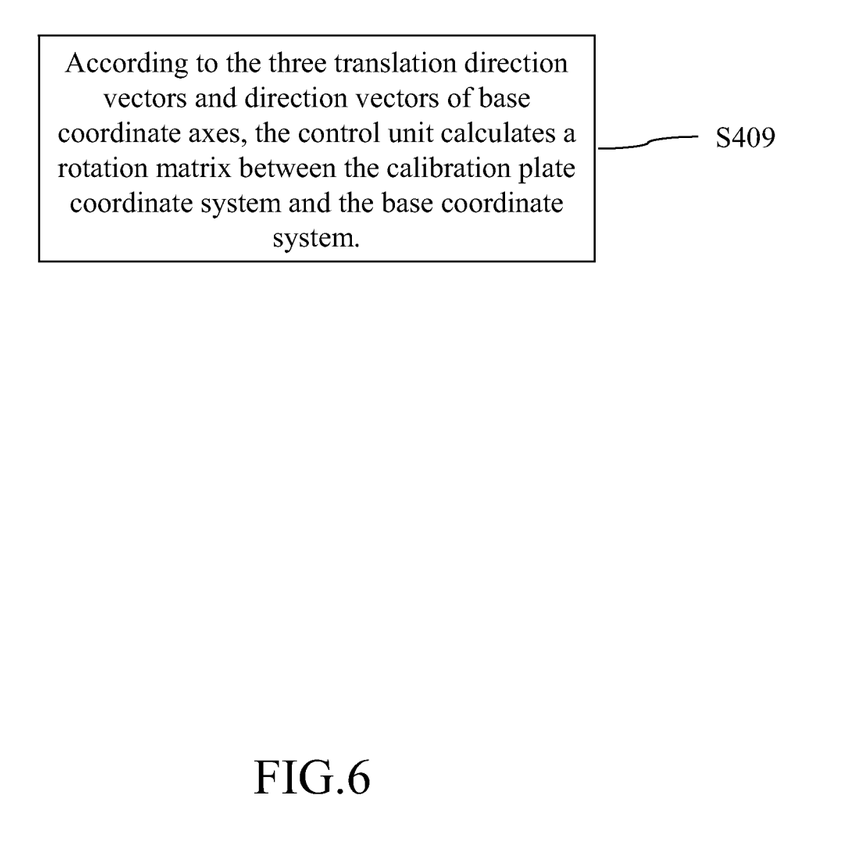

Moreover, according to an embodiment of the present invention, the positioning step of the robot may be used to perform a calibration step of the robot. Referring to FIG. 4 to FIG. 6, in this embodiment, the calibration step of the robot is divided into two parts, that is, a calibration step of obtaining a translation matrix and a calibration step of obtaining a rotation matrix, in which the calibration step of obtaining the translation matrix comprises S401 to S405, and the calibration step of obtaining the rotation matrix comprises S406 to S409.

The calibration step of obtaining the translation matrix is first illustrated in detail below. Referring to FIG. 8 to FIG. 11B, firstly, in Step S401, the control unit 120 drives the robot 100 to rotate around one point on a coordinate axis of the calibration plate coordinate system 320 as a center point 410, and records multiple rotation positions of the optical sensing device 200. Then, in Step S402, according to the rotation positions, the positioning step of the robot is performed, in which the control unit 120 calculates a rotation coordinate value of each rotation position in the calibration plate coordinate system 320. Afterward, in Step S403, according to the rotation coordinate values, the control unit 120 calculates a center point-calibration plate coordinate value of the center point 410 in the calibration plate coordinate system 320. Next, in Step S404, the control unit 120 calculates a center point-base coordinate value of the center point 410 in the base coordinate system 111. Then, in Step S405, according to the center point-base coordinate value and the center point-calibration plate coordinate value, the control unit 120 calculates a translation matrix between the calibration plate coordinate system 320 and the base coordinate system 111.

Figure 11A:
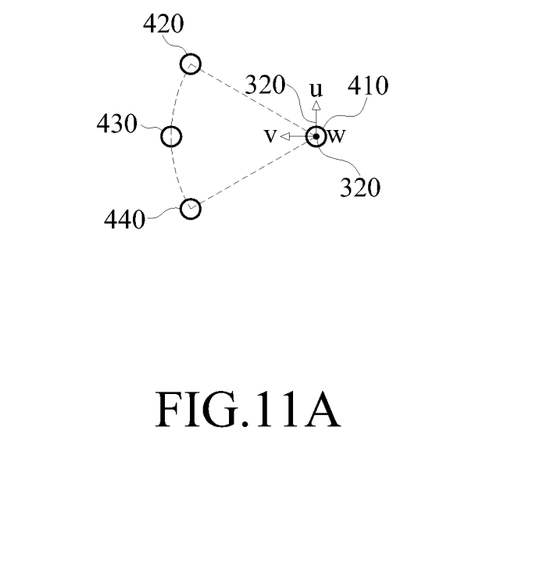
FIG. 11A is a schematic view of the rotation of the optical sensing device 200 in a robot positioning method and calibration method according to an embodiment of the present invention.

For example, the control unit 120 drives the robot 100 to rotate around one point on a coordinate axis of the calibration plate coordinate system 320 as the center point 410, so as to obtain three rotation positions of the optical sensing device 200, which are respectively a first rotation position 420, a second rotation position 430, and a third rotation position 440. The above robot positioning method is adopted to obtain rotation coordinate values $(x_1, y_1, z_1)$, $(x_2, y_2, z_2)$, and $(x_3, y_3, z_3)$ of the three rotation positions 420 to 430 in the calibration plate coordinate system 320. Then, the three rotation coordinate values $(x_1, y_1, z_1)$, $(x_2, y_2, z_2)$, and $(x_3, y_3, z_3)$ are used to obtain a center point-calibration plate coordinate value $(x_p, y_p, z_p)$ of the center point 410 in the calibration plate coordinate system 320. After that, the control unit 120 calculates a center point-base coordinate value $(x_q, y_q, z_q)$ of the center point 410 in the base coordinate system 111, and thus $[(x_p -$ $x_q$) $(y_p-y_q)$ $(z_p-z_q)$] is a translation matrix of the base coordinate system 111 and the calibration plate coordinate system 320.

Next, the calibration step of obtaining the rotation matrix is illustrated in detail below. Firstly, in Step S406, the control unit 120 drives the robot 100 to translate once sequentially along three orthogonal axes of the calibration plate coordinate system 320, and records multiple translation positions of the optical sensing device 200 in the calibration plate coordinate system 320. Then, in Step S407, according to the translation positions, the positioning step of the robot 100 is performed, in which the control unit 120 calculates a translation coordinate value of each translation position in the calibration plate coordinate system 320. In Step S408, according to the translation coordinate values, the control unit calculates three translation direction vectors in parallel with the three orthogonal axes of the calibration plate coordinate system. Afterward, in Step S409, according to the three translation direction vectors and direction vectors of base coordinate axes, the control unit 120 calculates a rotation matrix between the calibration plate coordinate system 320 and the base coordinate system 111.

Figure 11B:
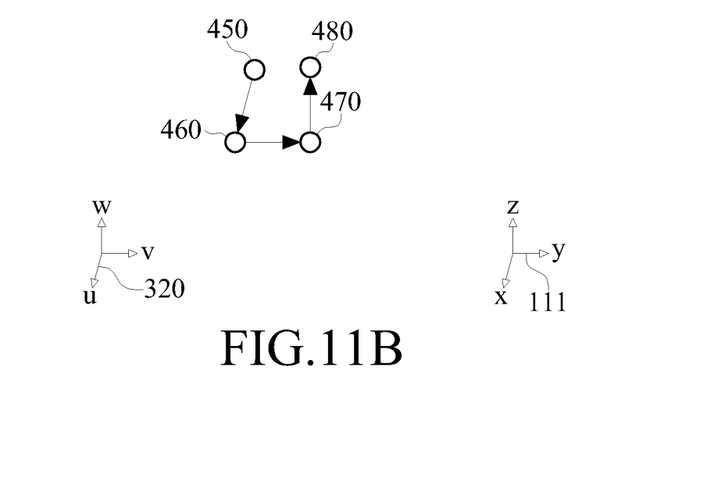
FIG. 11B is a schematic view of the translation of the optical sensing device 200 in a robot positioning method and calibration method according to an embodiment of the present invention.

For example, firstly, the control unit 120 drives the robot 100 to translate once sequentially along three orthogonal axes, that is, axes u, v, and w of the calibration plate coordinate system 320, to obtain four translation positions, which are respectively a first translation position 450, a second translation position 460, a third translation position 470, and a fourth translation position 480, and records the four translation positions of the optical sensing device 200 in the calibration plate coordinate system 320. Then, according to the positioning step of the robot, the control unit 120 calculates translation coordinate values $(u_1, v_1, w_1)$, $(u_2, v_1, w_1)$, $(u_1, v_3, w_1)$, and $(u_1, v_1, w_4)$ of the translation positions 450 to 470 in the calibration plate coordinate system 320. After that, according to the translation coordinate values, the control unit 120 calculates three translation direction vectors in parallel with the three orthogonal axes of the calibration plate coordinate system 320, in which the translation direction vector 1 is [$(u_2-u_1)$, 0, 0], the translation direction vector 2 is [0, $(v_3-v_1)$, 0], and the translation direction vector 3 is [0, 0, $w_4-w_1$], and the three translation direction vectors respectively represent direction vectors of the three orthogonal axes of the calibration plate coordinate system 320. Finally, according to a relation between the three translation direction vectors and direction vectors of three coordinate axes of the base, the control unit 120 calculates a rotation matrix between the calibration plate coordinate system 320 and the base coordinate system 111.

Figure 7:
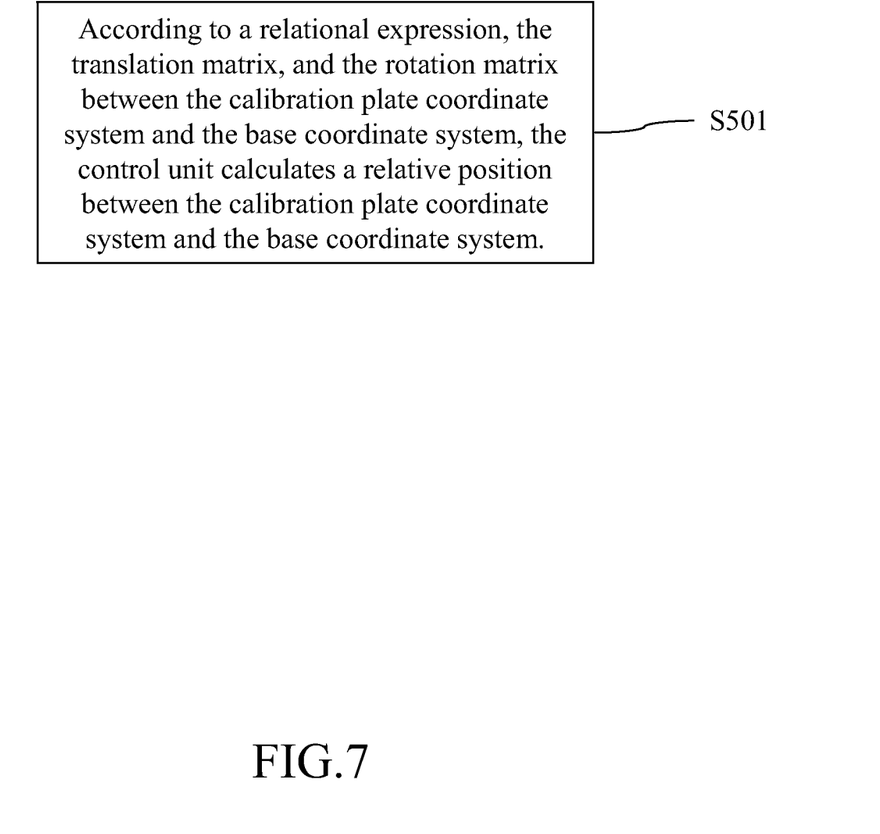
FIG. 7 is a flow chart of a checking method in a robot positioning method and calibration method according to an embodiment of the present invention.

Referring to FIG. 7, a robot calibration method according to an embodiment of the present invention further comprises a checking step. In Step S501, according to a relational expression, the translation matrix, and the rotation matrix between the calibration plate coordinate system 320 and the base coordinate system 111, the control unit 120 calculates a relative position between the calibration plate coordinate system 320 and the base coordinate system 111.

The relational expression mentioned in Step S501 is as follows:

$$P_G = P_R \times R + T$$

where $P_G$ is an origin coordinate value in the calibration plate coordinate system, $P_R$ is an origin coordinate value in the base coordinate system, R is the rotation matrix, and T is the translation matrix.

In the embodiments of the robot positioning method and calibration method according to the present invention, the optical sensing device 200 is directly configured on the front end of the robot 100, and the calibration plate 300 is used to obtain the position of the optical sensing device 200 in the calibration plate coordinate system 320. That is, in the present invention, the optical sensing device 200 on the robot 100 is used together with the calibration plate 300, to replace the calibration method in the prior art of electrically connecting the optical sensing device, the control unit 120, and the display device to the robot, and disposing an acicular object at the front end of the robot.

During the calibration process, since the optical sensing device 200 is directly configured on the robot 100, the optical sensing device 200 captures the image and directly transmits the image back to the control unit 120 of the robot 100, so that no additional monitoring device needs to be configured. Thereby, as compared with the prior art, the method of configuring the optical sensing device 200 on the robot can save the apparatus cost.

In the embodiments of the robot positioning method and calibration method according to the present invention, when the robot 100 needs to be calibrated, the calibration plate 300 can be randomly disposed at any fixed position, and thus the acicular object does not need to be arranged on the robot, as described in the prior art. Thereby, as compared with the prior art, the method of replacing the acicular object with the calibration plate 300 can save the time taken before installation.

In addition, when considering mirror correction deformation error values, in the present invention, the distortion error value is also substituted into the Bundle Adjustment, so that the optical sensing device 200 captures the image, and the control unit 120 calculates the transformation matrix and the distortion error value at the same time. Thereby, as compared with the prior art, the mirror correction deformation error value can be considered to increase the precision of the calibration.

What is claimed is:
1. A robot positioning method, comprising:
providing a robot, having a control unit, wherein an optical sensing device is disposed on a front end of the robot, and the optical sensing device has an optical sensing device coordinate system fixed thereon, wherein the optical sensing device comprises a lens and a charge coupled device (CCD), the CCD has an optical sensing surface and has an optical sensing surface coordinate system fixed on the optical sensing surface;
providing a calibration plate, wherein multiple positioning marks are disposed on a surface of the plate, and the calibration plate has a calibration plate coordinate system fixed thereon; and
performing a positioning step, comprising:
capturing by the optical sensing device a calibration plate image; and
according to the calibration plate image, calculating by the control unit a transformation matrix between the optical sensing device coordinate system and the calibration plate coordinate system and an optical sensing device-calibration plate coordinate value;
wherein the step of calculating the transformation matrix comprises:
capturing by the control unit a positioning mark-calibration plate coordinate value of each positioning mark in the calibration plate coordinate system;
capturing by the control unit a positioning mark-optical sensing surface coordinate value of each positioning mark in the calibration plate image in the optical sensing surface coordinate system; and substituting by the control unit the positioning mark-calibration plate coordinate values, the positioning mark-optical sensing surface coordinate values, and a focal length value of the lens into a Bundle Adjustment formula, to calculate multiple matrix elements of the transformation matrix and the optical sensing device-calibration plate coordinate value, wherein the Bundle Adjustment formula is as follows:

$$x_a - x_0 = -f\left[\frac{m_{11}(X_A - X_L) + m_{12}(Y_A - Y_L) + m_{13}(Z_A - Z_L)}{m_{31}(X_A - X_L) + m_{32}(Y_A - Y_L) + m_{33}(Z_A - Z_L)}\right]$$

$$y_a - y_0 = -f\left[\frac{m_{21}(X_A - X_L) + m_{22}(Y_A - Y_L) + m_{23}(Z_A - Z_L)}{m_{31}(X_A - X_L) + m_{32}(Y_A - Y_L) + m_{33}(Z_A - Z_L)}\right]$$

where $x_a$ and $y_a$ are the positioning mark-optical sensing surface coordinate value of the positioning mark in the optical sensing surface coordinate system, $x_0$ and $y_0$ are a projection center of the optical sensing surface coordinate system, $m_{ij}$ is the matrix element of the transformation matrix between the optical sensing device coordinate system and the calibration plate coordinate system, where i: 1 to 3 and j: 1 to 3, $X_A, Y_A$, and $Z_A$ are the positioning mark-calibration plate coordinate value of the positioning mark in the calibration plate coordinate system, and $X_L, Y_L$ and $Z_L$ are the optical sensing device-calibration plate coordinate value of the optical sensing device in the calibration plate coordinate system.

2. A robot calibration method, comprising:
providing a robot, having a control unit and a base, wherein a base coordinate system is fixed on the base, an optical sensing device is disposed on a front end of the robot, and the optical sensing device has an optical sensing device coordinate system fixed thereon;
providing a calibration plate, wherein multiple positioning marks are disposed on a surface of the plate, and the calibration plate has a calibration plate coordinate system fixed thereon;
driving by the control unit the robot to rotate around one point on a coordinate axis of the calibration plate coordinate system as a center point, and recording multiple rotation positions of the optical sensing device;
according to the rotation positions, performing the positioning step according to claim 1, wherein the control unit calculates multiple rotation coordinate values of the rotation positions in the calibration plate coordinate system;
according to the rotation coordinate values, calculating by the control unit a center point-calibration plate coordinate value of the center point in the calibration plate coordinate system;
calculating by the control unit a center point-base coordinate value of the center point in the base coordinate system;
according to the center point-base coordinate value and the center point-calibration plate coordinate value, calculating by the control unit a translation matrix between the calibration plate coordinate system and the base coordinate system;
driving by the control unit the robot to translate once sequentially along three orthogonal axes of the calibration plate coordinate system, and recording multiple translation positions of the optical sensing device in the calibration plate coordinate system;
according to the translation positions, performing the positioning step according to claim 1, wherein the control unit calculates a translation coordinate value of each translation position in the calibration plate coordinate system;
according to the translation coordinate values, calculating by the control unit three translation direction vectors in parallel with the three orthogonal axes of the calibration plate coordinate system; and
according to the three translation direction vectors and direction vectors of base coordinate axes, calculating by the control unit a rotation matrix between the calibration plate coordinate system and the base coordinate system.

3. The robot calibration method according to claim 2, further comprising a checking step, wherein the checking step comprises:
according to a relational expression, the translation matrix, and the rotation matrix between the calibration plate coordinate system and the base coordinate system, calculating by the control unit a relative position between the calibration plate coordinate system and the base coordinate system, wherein the relational expression is as follows:

$$P_G = P_R \times R + T$$

where $P_G$ is an origin coordinate value in the calibration plate coordinate system, $P_R$ is an origin coordinate value in the base coordinate system, R is the rotation matrix, and T is the translation matrix.

4. A robot positioning method, comprising:
providing a robot, having a control unit, wherein an optical sensing device is disposed on a front end of the robot, and the optical sensing device has an optical sensing device coordinate system fixed thereon, wherein the optical sensing device comprises a lens and a charge coupled device (CCD), the CCD has an optical sensing surface and has an optical sensing surface coordinate system fixed on the optical sensing surface;
providing a calibration plate, wherein multiple positioning marks are disposed on a surface of the plate, and the calibration plate has a calibration plate coordinate system fixed thereon; and
performing a positioning step, comprising:
capturing by the optical sensing device a calibration plate image; and
according to the calibration plate image, calculating by the control unit a transformation matrix between the optical sensing device coordinate system and the calibration plate coordinate system and an optical sensing device-calibration plate coordinate value;
wherein the step of calculating the transformation matrix comprises:
capturing by the control unit a positioning mark-calibration plate coordinate value of each positioning mark in the calibration plate coordinate system;
capturing by the control unit a positioning mark-optical sensing surface coordinate value of each positioning mark in the calibration plate image in the optical sensing surface coordinate system;
using one of the positioning mark-optical sensing surface coordinate values as a reference point, and calculating by the control unit a distance value between each of the rest positioning mark-optical sensing surface coordinate values and the reference point; and
substituting by the control unit the positioning mark-calibration plate coordinate values, the positioning mark-optical sensing surface coordinate values, the distance values, and a focal length value of the lens into a Bundle Adjustment formula to calculate multiple matrix elements in the transformation matrix and the optical sensing device-calibration plate coordinate value, wherein the Bundle Adjustment formula turns to:

$$(x_a + \delta x + \Delta x) - x_0 =$$
$$-f\left[\frac{m_{11}(X_A - X_L) + m_{12}(Y_A - Y_L) + m_{13}(Z_A - Z_L)}{m_{31}(X_A - X_L) + m_{32}(Y_A - Y_L) + m_{33}(Z_A - Z_L)}\right]$$

$$(y_a + \delta y + \Delta y) - y_0 =$$
$$-f\left[\frac{m_{21}(X_A - X_L) + m_{22}(Y_A - Y_L) + m_{23}(Z_A - Z_L)}{m_{31}(X_A - X_L) + m_{32}(Y_A - Y_L) + m_{33}(Z_A - Z_L)}\right]$$

where $$\begin{cases} \delta x = \bar{x}(k_1 r^2 + k_2 r^4) \\ \delta y = \bar{y}(k_1 r^2 + k_2 r^4) \\ \Delta x = (1 + p_3 r^2)[p_1(r^2 + 2\bar{x}^2) + 2p_2 \bar{x}\bar{y}] \\ \Delta y = (1 + p_3 r^2)[2p_1 \bar{x}\bar{y} + p_2(r^2 + 2\bar{y}^2)], \end{cases}$$

$x_a$ and $y_a$ are the positioning mark-optical sensing surface coordinate value of the positioning mark in the optical sensing surface coordinate system, $x_0$ and $y_0$ are a projection center of the optical sensing surface coordinate system, r is the distance value between each positioning mark-optical sensing surface coordinate value and the reference point, $m_{ij}$ is the matrix element in the transformation matrix between the optical sensing device coordinate system and the calibration plate coordinate system, where i: 1 to 3 and j: 1 to 3, $X_A$, $Y_A$, and $Z_A$ are the positioning mark-calibration plate coordinate value of the positioning mark on three orthogonal coordinate axes of the calibration plate coordinate system, $X_L$, $Y_L$, and $Z_L$ are the optical sensing device-calibration plate coordinate value of a coordinate center on the orthogonal coordinate axes of the calibration plate coordinate system, $K_1$, $K_2$, $K_3$, $P_1$, $P_2$, and $P_3$ are lens distortion parameter values, $\delta x$ and $\delta y$ are a barrel distortion error correction value of the optical sensing device, and $\Delta x$ and $\Delta y$ are a tangential distortion error correction value of the optical sensing device.

\* \* \* \* \*